US009177161B2

(12) United States Patent
Loisel et al.

(10) Patent No.: US 9,177,161 B2
(45) Date of Patent: Nov. 3, 2015

(54) SYSTEMS AND METHODS FOR SECURE ACCESS MODULES

(71) Applicant: Maxim Integrated Products, Inc., San Jose, CA (US)

(72) Inventors: Yann Yves Rene Loisel, La Ciotat (FR); Bhartendu Mishra, Bangalore (IN)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/189,677

(22) Filed: Feb. 25, 2014

(65) Prior Publication Data

US 2014/0281586 A1 Sep. 18, 2014

(30) Foreign Application Priority Data

Mar. 15, 2013 (IN) ............................ 803MUM2013

(51) Int. Cl.

| | |
|---|---|
| ***H04L 29/06*** | (2006.01) |
| ***G06F 21/60*** | (2013.01) |
| ***G06F 21/34*** | (2013.01) |
| ***G06F 21/44*** | (2013.01) |

(52) U.S. Cl.

CPC .............. *G06F 21/602* (2013.01); *G06F 21/34* (2013.01); *G06F 21/445* (2013.01)

(58) Field of Classification Search

CPC ...... G06F 21/602; G06F 21/445; G06F 21/34

USPC ........................................................ 713/193

See application file for complete search history.

(56) References Cited

U.S. PATENT DOCUMENTS

| | | | | |
|---|---|---|---|---|
| 6,615,351 | B1 * | 9/2003 | Sedlak et al. | 713/172 |
| 7,343,496 | B1 * | 3/2008 | Hsiang et al. | 713/194 |
| 7,962,742 | B2 * | 6/2011 | Schwarz | 713/151 |
| 8,949,608 | B2 * | 2/2015 | Hoornaert et al. | 713/172 |
| 2003/0005323 | A1 * | 1/2003 | Hanley et al. | 713/194 |
| 2003/0212601 | A1 * | 11/2003 | Silva et al. | 705/17 |
| 2004/0252838 | A1 * | 12/2004 | Ma | 380/270 |
| 2005/0061875 | A1 * | 3/2005 | Zai et al. | 235/383 |
| 2005/0195975 | A1 * | 9/2005 | Kawakita | 380/30 |
| 2006/0064458 | A1 * | 3/2006 | Gehrmann | 709/203 |
| 2007/0251997 | A1 * | 11/2007 | Brown et al. | 235/380 |
| 2011/0029786 | A1 * | 2/2011 | Raffard et al. | 713/193 |
| 2011/0095084 | A1 * | 4/2011 | Tian et al. | 235/379 |
| 2011/0264926 | A1 * | 10/2011 | Guthery | 713/193 |
| 2012/0159152 | A1 * | 6/2012 | Ha et al. | 713/155 |
| 2013/0119130 | A1 * | 5/2013 | Braams | 235/382 |

* cited by examiner

*Primary Examiner* — Michael S McNally

(74) *Attorney, Agent, or Firm* — North Weber & Baugh LLP

(57) ABSTRACT

Various embodiments of the invention provide a strong logical link between a SAM and a secure terminal to combat SAM counterfeiting and misuse. The link is based on mutual validation methods using firmware and cryptographic protocols. Once the SAM is removed from a terminal that it has been tied to, or the link is broken by a tampering attempt of a potential intruder, the SAM and/or the terminal are disabled.

18 Claims, 5 Drawing Sheets

SYSTEMS AND METHODS FOR SECURE ACCESS MODULES

CROSS REFERENCE TO RELATED PATENT APPLICATIONS

The present application claims priority to Indian Patent Application No. 803/MUM/2013, titled "Systems and Methods for Secure Access Modules," filed Mar. 15, 2013, by Yann Yves Rene Loisel and Bhartendu Mishra, which application is hereby incorporated herein by reference in its entirety.

BACKGROUND

A. Technical Field

The present invention relates to secure terminals, and more particularly, to systems, devices, and methods of preventing unauthorized re-use of a secure access module (SAM) in another terminal.

B. Background of the Invention

Commercial secure terminals, such as financial terminals are oftentimes equipped with SAMs, which are secure microchips, e.g., in a SIM format, that have some type of secret information embedded.

Typically, the operator of a terminal that contains valuables controls access to the terminal through the SAM. The SAM is configured to receive and exchange commands sent by the terminal, but does not expose within the terminal the secret information embedded in the SAM. However, a SAM's security is compromised, for example, when it is physically removed from a payment terminal that is vulnerable to attack. The SAM is subject to subsequent counterfeiting and misuse it in an unauthorized terminal.

In order to increase security in certain applications, additional security measures include a requirement that a SAM does not operate in any terminal other than its original terminal. This, in turn, requires that the SAM and the terminal be tightly associated. Existing terminal approaches tie the SAM to the terminal by embedding the SAM in a more or less reliable, physically tamper-resistant compartment within the terminal in order to create a relatively secure enclosure that may be additionally equipped with physical intrusion sensors.

Unfortunately, such designs that rely on a strong physical link for protection against theft increase the complexity involved in the design of the enclosure and unnecessarily raise the cost of production and maintenance (e.g., moisture, shock, false alarms). In addition, each secure terminal manufacturer may require and modify its own standard measures, which creates discrepancies in the level of protection and provide an additional target for potential intruders that seek to exploit the weakest design features. Therefore, such complex and expensive implementations do not lend themselves to mass deployment in high volume markets, such as micro-ATM applications. What is needed are tools for designers of secure systems to overcome the above-described limitations.

SUMMARY OF THE INVENTION

Various embodiments of the invention allow for an easy to implement, inexpensive, and reliable link between a particular SAM and a secure terminal to prevent unauthorized activities, such as using the SAM in a terminal other than the one it is logically linked to.

In certain embodiments, the logical link is implemented via a firmware that uses a cryptographic protocol. The firmware associates the highly secure SAM with a specific terminal in such a manner that, at the time of the first pairing, the SAM will be locked into a permanent state that will prevent the SAM from being paired again with any other unauthorized terminal. In various embodiments, the communication between a SAM and terminal is based on a mutual validation principle that allows the devices, once coupled, to mutually verify their shared secret knowledge upon request for authentication or at random intervals.

An additional risk management feature is provided by certain embodiments in which the terminal secret is loaded into a battery-backed secured area within the terminal. The terminal is configured to delete the pairing information as soon a tampering attempt is detected in order to prevent any potential intruder from circumventing the protection provided by the pairing. This further enhances the level of security provided by the secure terminal.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document open the terms "key" and "secret" are used interchangeably. Further, although this document makes reference to secure financial terminal such as payment terminals, the invention is not limited to thereto. Various embodiments can equally be used in non-payment terminals recognized by one of skilled in the art, e.g., retail dispensing devices. Accordingly, the term "operator" refers to distributors of goods, payment card processors, or other individuals and entities operating a secure terminal.

Figure 1:
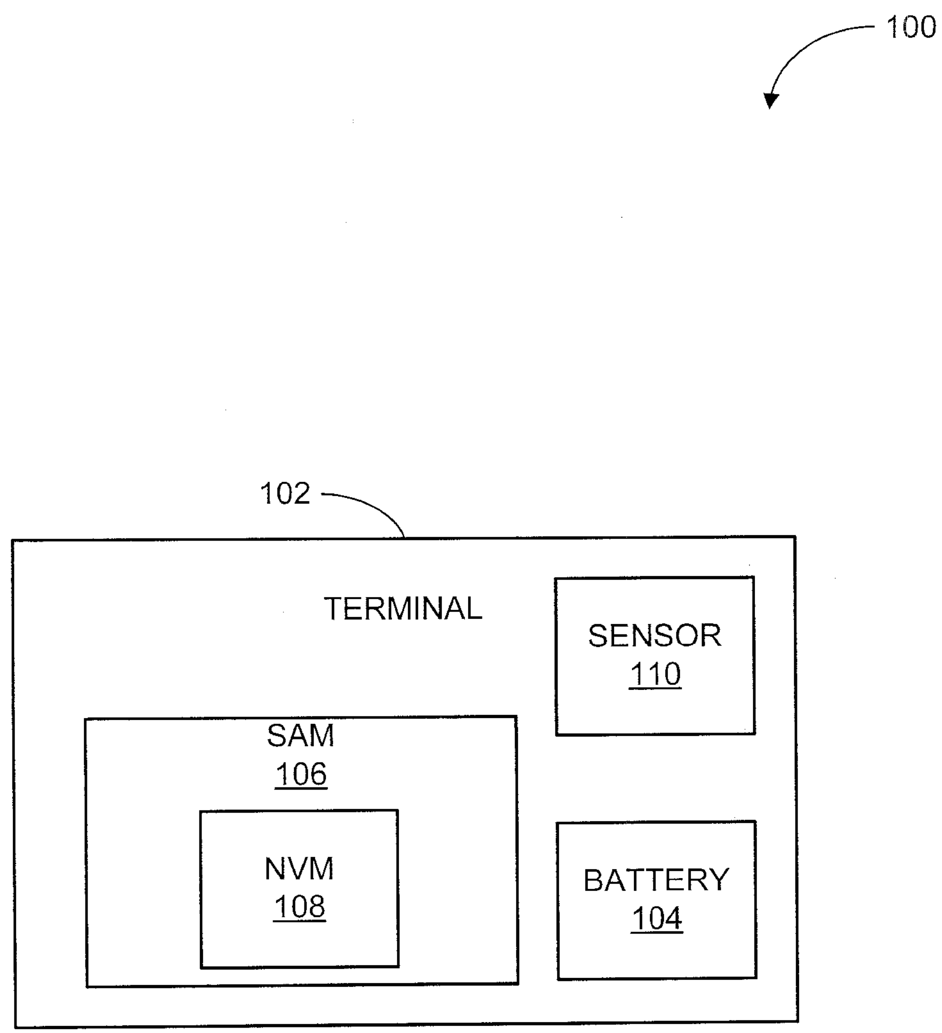
FIG. 1 shows a prior art security system utilizing a SAM and a terminal.

FIG. 1 shows a prior art security system utilizing a SAM and a transaction terminal. System 100 comprises sensor 110, SAM 106, and battery 104, which are installed inside terminal 102. SAM 106 is a relatively secure electronic device that comprises a nonvolatile memory 108 to receive and store encrypted confidential data, including identification information and transaction data, that is not easily accessible. A common SAM socket, for example, implemented in a dedicated smart card reader, receives SAM 106 and connects it via a connector that is designed to resist tampering with terminal 102.

Terminal 102 is a common financial transaction terminal as is widely used in the financial industry. SAM 106 is embedded or encapsulated in a secured compartment (not shown) inside terminal 102 in order to increase the level of security. Terminal 102 is designed and built in such a way that it cannot be easily opened by force. As such, terminal 102 provides a relatively secure physical enclosure against intrusion and physical removal of SAM 106. In addition, system 100 is equipped with a tamper detection mechanism that, if a tamper attempt is made, detects the security breach via an actuator or physical intrusion sensor 110, e.g., a vibration sensor.

In operation, SAM 106 and terminal 102 exchange commands and messages through a communication channel to enable financial transactions. Once sensor 110 is triggered, it activates an alarm signal that is electronically transmitted, e.g., to a host computer or a terminal software, and converted to a message intended to alert the terminal operator. At the time of the alarm, an acoustic signal may be emitted to deter potential intruders form attempting to remove SAM 106. SAM 106 itself is generally not equipped with any security functions to detect a tamper attempt. In the case of dedicated SIM cards, which are passive elements, no power is provided to the SIM that could provide an alarm function in response to an attack scenario. Software built-in to terminal 102 may take the alarm into account in determining whether the detected signal indeed constitutes a tamper attempt.

Overall, system 100, heavily relies on a strong physical link between terminal 102 and SAM 106, which increases the cost of production and maintenance of system 100. Therefore, would be desirable to have a simpler and less expensive method of protection that does not almost entirely rely on physical security measures.

Figure 2:
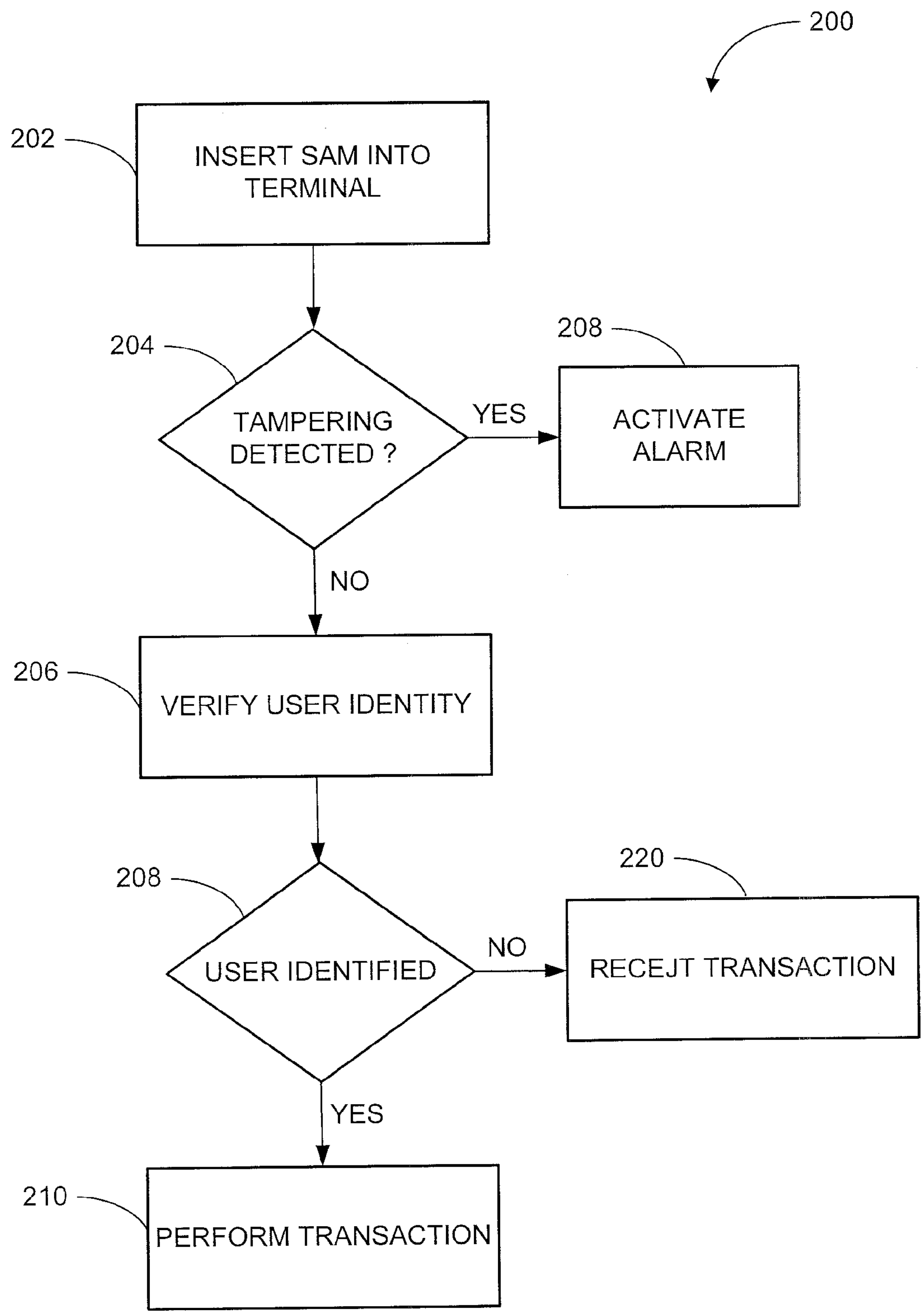
FIG. 2 is a flowchart illustrating a process for a prior art security system utilizing a SAM and a terminal.

FIG. 2 is a flowchart illustrating a process for a prior art security system utilizing a SAM and a terminal. The process starts at step 204 when a SAM is inserted into a terminal, such as a payment terminal. The SAM is, for example, a SIM card reader within the payment terminal.

At step 204, the terminal decides whether tampering is detected. If so, then at step 208, the security system activates an alarm. If no tampering is detected, then at step 206, the system verifies the identity of the user.

If, at step 208, the identity information of the user is verified, then at step 210 the terminal executes a transaction, for example, a financial transaction, which typically includes a user verification process. On the other hand, if user identification is unsuccessful, then, at step 220, the system rejects the transaction.

Figure 3:
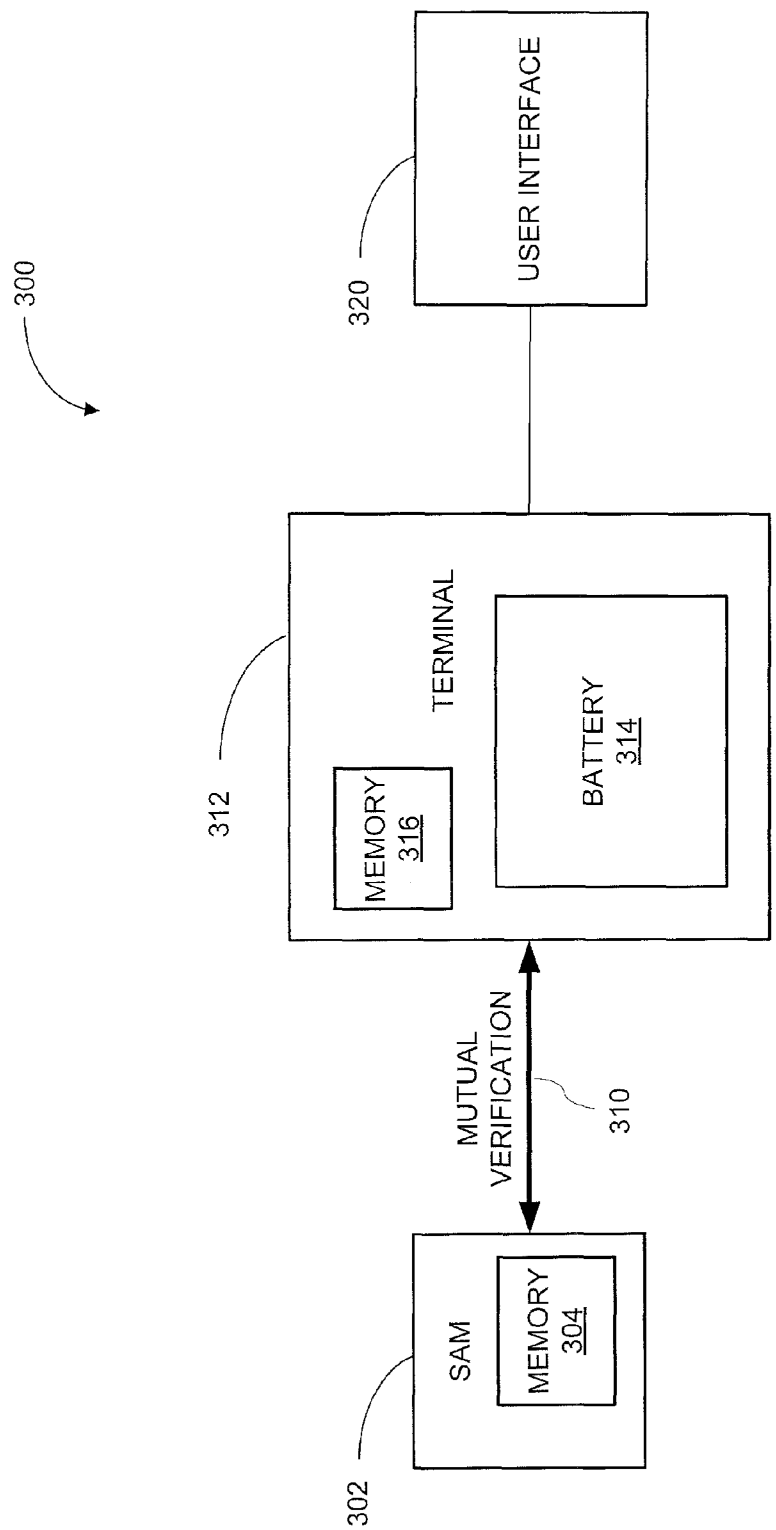
FIG. 3 is a block diagram of an illustrative paired security system, according to various embodiments of the invention.

FIG. 3 is a block diagram of an illustrative paired security system, according to various embodiments of the invention. System 300 comprises SAM 302 and terminal 312, which further comprises user interface 320. SAM 302 is coupled to memory 304, and terminal 312 is coupled to battery 314, memory 316, and user interface 320. SAM 302 and terminal 312 are coupled to each other via communication channel 310. In one embodiment, SAM 302, memory 316, and battery 314 are installed within terminal 312. SAM 302 is a secure electronic device, which may be implemented as a secure microcontroller that uses smart card based technology, a miniature computer that comprises a CPU, or a SIM card reader that comprises memory 304.

Depending on the implementation, SAM 302 may require an internal power source for operation. In one embodiment, memory 304 comprises a secret that is shared only with memory 316. The secret may be assigned or provided by, for example, a data center that operates terminal 312. The secret may be embedded into memory 304 as a code, electronic key, or similar during a personalization step that employs common security measures. Although memory 304 may be based on secure terminal architecture, such that SAM 302 may be configured to be read by a card reader, SAM 302 fulfills additional functions beyond merely receiving and storing encrypted confidential data in order to increase the level of security. In particular, a cryptographic engine may processes the secret together with other data or software to provide a functional rather than physical protection.

Depending on the desired level of security the secret may include a high-level reliability key, for example, one that is programmed by relatively sophisticated firmware and controlled by the operator, while the level of security provided by terminal 312 may be less demanding, e.g., a medium confidence key that is programmed by the terminal manufacturer. In one embodiment, memory 304 stores confidential data, such as identification information and transaction data, and processes cryptographic commands to communicate with terminal 312. Once user credentials are verified, they entitle a user to receive cash or goods from terminal 312, make a payment, etc. SAM 302 is typically coupled, e.g., via a wired connection, to terminal 312.

Terminal 312 is a transaction system, such as a financial transaction terminal, a smart phone, or a commercial transaction system that is entrusted with goods, ballots, or other receivables for protection. The physical form factor of terminal 312 is designed sufficiently large to hold a backup battery within terminal 312. The battery provides 24/7 power for an extended period of time to ensure uninterrupted protection, additionally security monitoring is in place in the event of a power outage or interruption. In particular, the battery provides power to memory 316, which stores the secret. The battery-backed memory may be based on known secure payment terminal architecture.

In one embodiment, terminal 312 is equipped with a tamper detection mechanism that is configured to detect a security breach via one or more actuators or sensors (not shown). Additionally, terminal 312 may be permanently coupled to a remote host, such as a back-end server, to establish communication via a secure network connection (not shown) to perform secure online transactions.

When SAM 302 and terminal 312 are initially coupled to each other, a simple and quick initialization process pairs the previously unpaired SAM 302 with terminal 312, such that both devices share a common secret. This initialization process can be performed, for example, during the manufacturing phase or in the post-manufacturing phase in a controlled secure environment. The initial pairing results in the secret being present on both deceives and being tied to each other and available for mutual authorization. Prior to initiating any user-related transactions, both devices agree on the shared secret during the mutual authorization step.

In one embodiment, the communication between SAM 302 and terminal 312 during the pairing involves the use of a cryptographic pairing protocol (e.g., Diffie-Hellman) that comprises shared secrets between SAM 302 and terminal 312. The complexity of the pairing protocol depends on the desired security level, which may vary depending on the environment where the initial pairing takes places as well as the used algorithm (e.g., symmetric algorithms, such as AES, or public key cryptography, such as RSA or elliptic curves). One skilled in the art will recognize that, prior to the initial pairing, the secret may be pre-loaded into firmware or pre-programmed into software, for example, in the form of a cryptographic key in order to pre-authenticate each device.

In one specific embodiment, as part of the initialization process, SAM 302 and/or terminal 312 may be modified, such that SAM 302 is permanently locked to authorized terminal 312 and denies operation when a subsequent attempt is made to couple SAM 302 with an unauthorized terminal. Conversely, terminal 312 is locked to SAM 302, for example, by storing the shared secret in battery-backuped memory 316 to indicate that the initial pairing is complete. As a result, initial pairing is limited to a non-repeating authentication process that cannot take place more than once.

Once the first pairing via the cryptographic exchange is completed, such that SAM 302 and terminal 312 agree on a shared secret, SAM 106 and terminal 102 exchange commands and messages through a communication channel 310 to enable transactions and, in one embodiment, upon request by either SAM (e.g., via the firmware) or terminal (via the terminal application) mutually validate the shared secret. It is understood that, in alternate embodiments, mutual validation can occur at any desired time or at a scheduled event, such as at startup, or even at random time intervals. As such, pairing provides a logical link, based on trusted, strong cryptographic algorithms and functional and logical connectivity, which increases security and lowers cost.

Terminal 312 is coupled to user interface 320 to allow for human interaction, such as data entry, etc. In one embodiment, terminal 312 comprises a reader that receives biometric data via user interface 320. The data is used to register credentials of a person, e.g., fingerprints in order to authenticate the person to terminal 312 via embedded SAM 302. After the person is uniquely identified, SAM 302 and/or terminal 312 perform the transaction and electronically sign the transaction data (e.g., payment amount, date, fingerprint, etc.) using a secret key which may be different than the shared secret. In one embodiment, the secret key comprises credentials of the operator that are used to sign the transaction. Once the transaction is completed, transaction-related data may be stored and logged in SAM 302 and/or terminal 312 for subsequent verification. The electronically signed data cannot be easily modified due to the secret key used to seal the transaction.

In one embodiment, SAM 302 comprises firmware designed to address functional and security requirements. SAM 302 may be equipped with security functions to detect tamper attempts and provide a response, e.g., by causing an alarm to be triggered. In the event that the logical link between SAM 302 and terminal 312 is broken, e.g., in response to detecting via an alarm system an abnormal condition, such as a physical tampering attempt or any other non-allowable event to be protected against, the security of SAM 302 is compromised and terminal 312 ceases to execute transactions via user interface 320 and may require maintenance by an authorized repair facility. Repair may include replacing SAM 302 and preparing terminal 312 to receive a new SAM, for example, by erasing the old secret key and replacing it with a different secret key. It is understood that field-replaceable configurations that allow repairs by authorized personnel are possible, but may be inherently less secure.

In the event that an intruder is able to successfully remove highly secure SAM 302 and access and retrieve the secret from memory 304 (which is considered practically impossible and out of the scope of this innovation), and manages to circumvent all other security measures, including biometric security features, attempts to use this information at another terminal will nevertheless remain fruitless. For example, the firmware of SAM 302 will not allow re-pairing with any unauthorized terminal for lack of mutual authorization. Similarly, retrieving the shared secret from terminal 312 is practically impossible since the secret that is stored in memory 316 is instantly deleted, for example by a controller (not shown), in case of any indication of tampering, including modifications to the physical and logical environment of terminal 312. As a result, system 300 provides a simple, low-cost, but highly secure protection against re-using a SAM that has been removed from one terminal at any other terminal once a device causes the common logical link to be broken.

Figure 4:
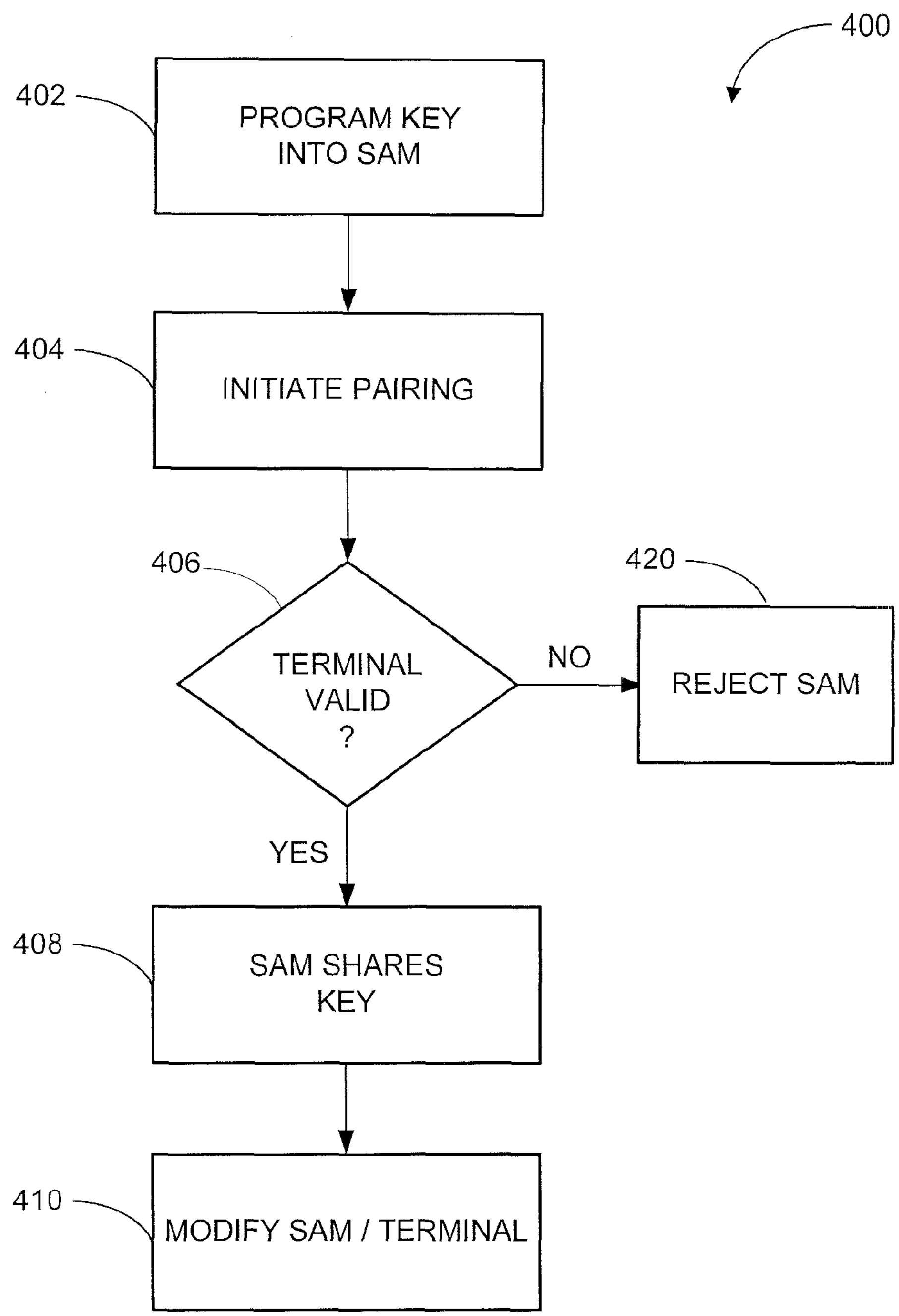
FIG. 4 is a flowchart illustrating a process for an initial secure pairing, according to various embodiments of the invention.

FIG. 4 is a flowchart illustrating a process for an initial secure pairing, according to various embodiments of the invention. At step 402, a secret is loaded onto a SAM device and a terminal device. Each device comprises memory to hold the encrypted secret. The level of encryption may be different for each device. The devices may also contain firmware to establish secure communication with each other.

The process for initial pairing between SAM and terminal starts at step 404, when the SAM is coupled to the terminal, for example, via a firmware that associates the two devices with each other. At step 406, the SAM examines the validity of the terminal, and if the terminal is authorized to operate with the SAM, the SAM shares the secret with the terminal. If the terminal is found to be invalid, i.e., mutual authorization fails, the terminal rejects the SAM at step 420.

Once mutual authorization is successful, at step 410, the SAM and/or the terminal are modified, e.g. by firmware, in order to indicate that the initial pairing is complete.

Figure 5:
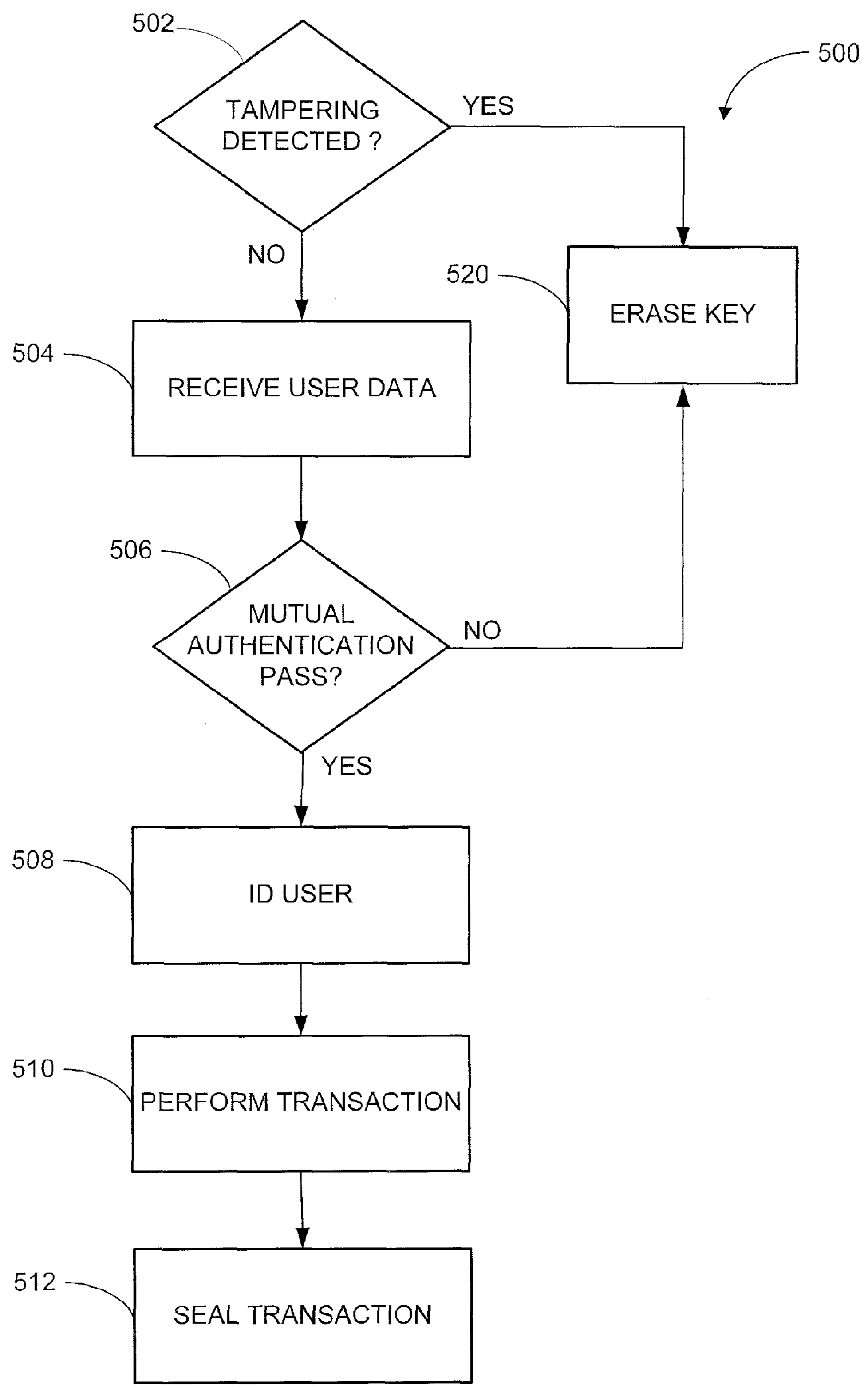
FIG. 5 is a flowchart of an illustrative process for operating a securely paired security system in accordance with various embodiments of the invention.

FIG. 5 is a flowchart of an illustrative process for operating a securely paired security system in accordance with various embodiments of the invention. At step 502, if a tampering attempt is detected, then at step 520, an encrypted secret is permanently deleted from the memory of the terminal and/or SAM to prevent subsequent misuse of the SAM. Otherwise, at step 504, the terminal receives user data, for example, through a user interface.

At step 506, the SAM and the terminal engage in a mutual authentication process to verify the identity of each other by sharing the secret.

If the unique identity information cannot be verified, then the process returns to step 520, where the encrypted secret is permanently deleted from the memory of the terminal and/or SAM.

If authentication is successful, then at step 508 the identity information of the user is verified by the terminal, before at step 510, the user-initiated transaction is executed.

Finally, at step 512, the SAM seals the transaction, for example, by using a secret in order to securely document the transaction.

It will be appreciated by those skilled in the art that fewer or additional steps may be incorporated with the steps illustrated herein without departing from the scope of the invention. No particular order is implied by the arrangement of blocks within the flowchart or the description herein.

It will be appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A secure transaction system comprising:

a secure element;

a first memory coupled to the secure element, the first memory is configured to hold a first secret information;

a terminal configured to couple to the secure element, the terminal comprises a second memory that is configured to hold a second secret information, wherein the secure element and the terminal communicate over a first cryptographic protocol at a start-up condition and a second cryptographic protocol at regular operation; and a battery coupled to the terminal, the battery is configured to provide energy to the second memory.

2. The system according to claim 1, wherein the first and second secret information are encrypted.

3. The system according to claim 1, wherein the first and second secret information are encrypted with a different level of security.

4. The system according to claim 1, wherein the terminal comprises firmware configured to modify the second memory in response to a pairing verification.

5. The system according to claim 1, wherein the terminal comprises hardware configured to erase the second secret information in response to detecting a tampering signal.

6. The system according to claim 1, wherein the terminal comprises sensors to detect a tampering attempt.

7. The system according to claim 1, wherein the secure element comprises firmware that is configured to validate a transaction prior to execution.

8. The system according to claim 1, wherein the second secret information is pre-programmed into the second memory.

9. A method to establish a secure pairing, the method comprising:

establishing communication between first and second secure elements;

exchanging a secret between the first and second secure elements via a cryptographic protocol;

mutually verifying the secret; and modifying the secret within a secure memory to indicate that a successful secure pairing between the first and second secure elements.

10. The method according to claim 9, wherein establishing communication further comprises detecting the second secure element by the first secure element.

11. The method according to claim 9, wherein establishing communication further comprises transmitting the secret between the first and second secure element.

12. The method according to claim 9, wherein the secure memory is coupled to the second secure element.

13. The method according to claim 9, further comprising generating the secret in the first secure element.

14. The method according to claim 13, wherein generating comprises programming the secret.

15. A method to perform a secure transaction, the method comprising:

exchanging, at a start-up condition, a secret between a first secure element and a second secure element via a first cryptographic protocol;

using the first cryptographic protocol to mutually verify the secret;

communicating over a second cryptographic protocol;

receiving and storing user data;

identifying the user data;

validating a transaction using the user data; and if validation fails, erasing the secret from the second secure element.

16. The method according to claim 15, further comprising disabling at least the second secure element in response to detecting a predetermined condition.

17. The method according to claim 16, wherein disabling comprises erasing the secret from the second secure element.

18. The method according to claim 16, wherein detecting the predetermined condition comprises detecting a tampering attempt.

* * * * *